United States Patent
Gerkin

[15] 3,668,848
[45] June 13, 1972

[54] FRUIT PICKER

[72] Inventor: Harry H. Gerkin, East 1st Street, Loogootee, Ind. 47553

[22] Filed: May 21, 1971

[21] Appl. No.: 145,655

[52] U.S. Cl. ...................................................56/334
[51] Int. Cl. ...........................................A01g 19/08
[58] Field of Search................56/332, 333, 334, 335, 336

[56] References Cited

UNITED STATES PATENTS

| 505,556 | 9/1893 | Lee et al. | 56/334 |
| 2,736,158 | 2/1956 | Lynch | 56/333 |
| 3,374,613 | 3/1968 | McDonald | 56/334 |
| 1,825,601 | 9/1931 | Palmbush | 56/334 |

Primary Examiner—Russell R. Kinsey
Attorney—A. Yates Dowell and A. Yates Dowell, Jr.

[57] ABSTRACT

Fruit harvester apparatus for removing fruit from trees and including an elongated hollow pole with a fruit picker head mounted on one end and a pair of movable jaws mounted on the picker head to close behind a piece of fruit to permit the fruit to be separated from a tree. The jaws and the linkage which operates the jaws are retained in a non-protruding position with respect to the pole and picker head when the jaws are not in use.

1 Claim, 5 Drawing Figures

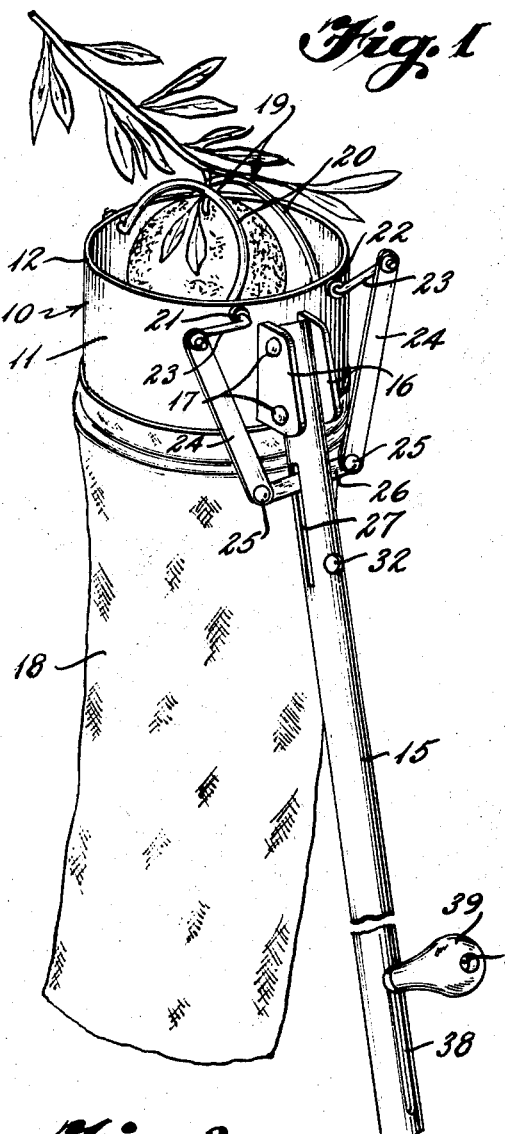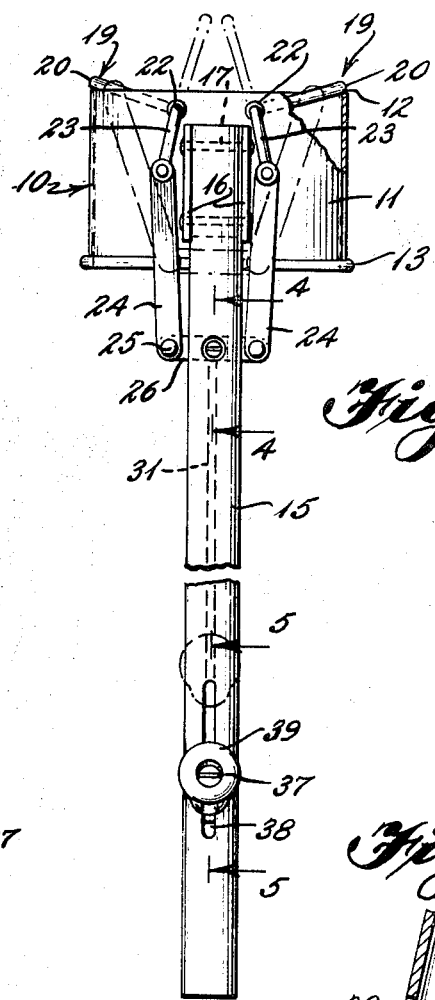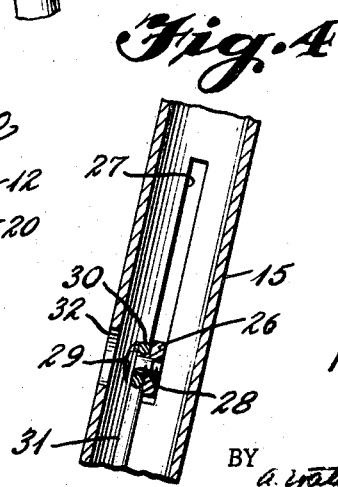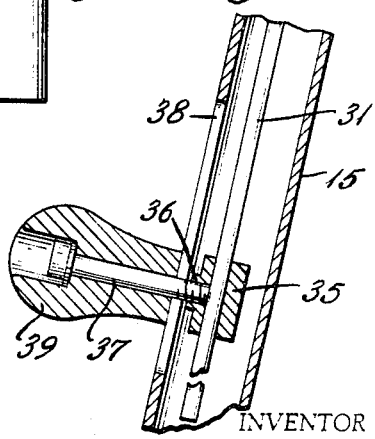
INVENTOR
HARRY H. GERKIN 3,668,848

FRUIT PICKER

BACKGROUND OF THE INVENTION

1. Field of the Invention

This application relates to pole-supported fruit harvesters which have one or more pivoted jaws for enclosing and removing fruit from trees.

2. Description of the Prior Art

Heretofore manually operated fruit harvesters of various kinds have been provided which allow workmen to stand on the ground and pick fruit from a tree. Some of these harvesters have included a pole, a fruit picker head, and a pair of jaws which move to engage the fruit so that such fruit can be removed from the tree.

The movable jaws have been located in an exposed position exteriorly of the picker head and have tended to snag the tree limbs and foliage when the head was moved toward the fruit suspended from a limb.

Some of these prior harvesters have been provided with a multi-part linkage normally connected to a rope, cable or other connecting means for operating the movable jaws from a remote position. However, the members of such linkages usually have protruded outwardly from the pole and picker head and have included projections which have engaged the limbs and foliage of a fruit tree.

SUMMARY OF THE INVENTION

The present invention is a fruit harvester having movable jaws located within a picker head mounted on one end of a hollow, lightweight pole in a manner that such jaws are not exposed while the picker head and the upper portion of the pole are being moved among the branches and foliage of a fruit tree. A linkage is provided for operating the jaws and one portion of such linkage is located within the hollow pole. Another portion of the linkage is located exteriorly of the pole and picker head but is maintained in close proximity thereto, while the picker apparatus is being moved through the branches and foliage. Thus the jaws and linkage are not likely to snag on the tree branches or foliage.

BRIEF DESCRIPTION OF THE DRAWINGS

FIG. 1 is a perspective illustrating one application of the invention.

FIG. 2 is a side elevation thereof.

FIG. 3 is a top plan view.

FIG. 4 is an enlarged fragmentary section on the line 4—4 of FIG. 2.

FIG. 5 is an enlarged fragmentary section on the line 5—5 of FIG. 2.

DESCRIPTION OF THE PREFERRED EMBODIMENTS

With continued reference to the drawing, the present invention includes a picker head 10 having a generally cylindrical body 11 terminating in an upper lip or edge 12 and a lower lip or edge 13. The cylindrical body 11 is constructed of metal, plastic or other sheet material and is rigidly attached to the upper portion of an elongated, hollow, lightweight pole or handle 15 by any suitable means. As illustrated, a pair of generally parallel ears or flanges 16 are mounted on the body 11 and project outwardly therefrom. Such ears are spaced apart a distance to receive the pole 15. Such body is fixed to the pole in any desired manner, as by bolts, rivets or other fasteners 17 which extend through openings in the spaced flanges 16 and the pole to connect the parts together. Preferably, a flexible discharge chute or tube 18 extends over the lower lip 13 and is mounted on the body 11 in any desired manner for conveying picked fruit to the ground.

In order to separate fruit from the tree, a pair of arcuate jaws 19 are rotatably mounted on the picker head adjacent its upper edge 12 and portions of such jaws may be moved toward each other to overlie the fruit and partially block the opening at the upper end of the picker head. Each of the jaws is constructed from an elongated rod and includes a central arcuate portion 20 with an outwardly extending end portion 21 at each end thereof. The end portions 21 are freely rotatably mounted in bearings 22 carried by the upper portion of the body 11. A crank arm 23 is welded or otherwise attached to one end portion of each jaw and such crank arm extends generally perpendicularly to the plane of the associated arcuate jaw, as illustrated in FIGS. 1 and 2.

A connecting link 24 is swingably mounted at one end to each of the crank arms 23 and the opposite end of each connecting link is swingably connected by a pivot 25 to a cross bar 26. The cross bar extends through the hollow handle 15 and is located within slots 27 disposed generally axially along opposite sides of the handle.

In order to raise and lower the cross bar 26 and thereby operate the jaws 19, the central portion of the cross bar 26 is provided with a threaded opening 28 for the reception of a screw 29 by means of which an eye 30 at one end of a rigid operating rod 31 is connected to the cross bar 26. To facilitate the application and removal of the screw 29, the handle 15 is provided with an opening 32 through which the screw 29 can be applied and removed.

The operating rod 31 extends downwardly through the hollow handle 15 to a position adjacent to the lower end thereof. As illustrated in FIG. 5, a sleeve 35 is slidably mounted on the operating rod adjacent the lower end and such sleeve has a threaded opening 36 for the reception of a set screw 37 which extends outwardly through a slot 38 in the lower portion of the handle 19. An operating knob 39 is carried by the set screw 37 exteriorly of the handle in such a manner that upward movement of the operating knob will cause a corresponding upward movement of the rod 31.

In the operation of the device, as illustrated best in FIG. 2, when the operating knob 39 and the rod 31 are in the lowermost position, the connecting links 24 are disposed alongside of and generally parallel to the upper portion of the handle 15, and the arcuate portions 20 of the jaws 19 are resting on the upper lip 12 of the body 11. In this position the handle 15 is manipulated so that the picker head 10 will pass through the foliage and between the branches of a fruit tree until the fruit to be picked is located substantially within the body 11. During the passage through the foliage and between the limbs, the crank arms 23 and the connecting links 24 are disposed adjacent to the handle 15 in a position where they are not likely to snag the foliage and the limbs of the tree.

When the fruit is located substantially within the body 11, the operating knob 39 is moved upwardly and causes the operating rod 31 to raise the cross bar 26. Upward movement of the cross bar causes the connecting links 24 to pivot the crank arms 23 and raise the central arcuate portions 20 of the jaws 19 to the position shown in full lines in FIG. 1 and in phantom lines in FIG. 2 where the jaws overlie the fruit. Thereafter a downward pull is applied to the handle 15 so that the jaws 19 engage the fruit and pull the fruit from the limb. The separated fruit will then fall by gravity through the discharge chute 18 and will be discharged onto the ground or into a receptacle without bruising the fruit. When the fruit has been separated from the limb, the operating knob 39 is moved downwardly to open the jaws 19 and the handle 15 is manipulated to place another fruit within the body 11 after which the process is repeated.

It is noted that the angular movement of the jaws 19 can be regulated by the position of the operating knob 39 with respect to the operating rod 31. In other words, if the jaws 19 are to be located adjacent to the stem of the fruit, such jaws can be moved together manually to a desired spacing after which the set screw 37 can be loosened and the operating knob 39 and the sleeve 35 can be moved along the operating rod 31 until the set screw engages the end of the slot 38. Thereafter the set screw 37 is tightened and the operating knob 39 is moved downwardly until the jaws 19 rest upon the upper lip 12 of the body. When the operating knob again is moved upwardly, the jaws 19 will return to the preset position and further movement will be stopped by the set screw 37 engaging the end of the slot 38. In this manner spacing between the jaws can be preset to any desired distance.

I claim:

1. A fruit picker for harvesting fruit by removing the fruit from trees comprising a hollow elongated pole, a generally tubular body having at least one open end, means mounting said body on one end of said pole with the axis of the body generally parallel with the axis of the pole, a pair of generally arcuate members swingably mounted on said body, said arcuate members being movable from an inoperative position adjacent to said body to an operative position adjacent to each other and across the open end of said body to engage fruit hanging from the trees, crank arm means fixed to one end of each of said arcuate members and disposed adjacent to said pole when said members are in inoperative position, connecting link means swingably connected at one end to each of said crank arm means and disposed adjacent to said pole when said arcuate members are in inoperative position, a rigid operating rod located within said hollow pole, means swingably connecting the opposite end of each of said connecting link means to one end of said operating rod, and knob means located exteriorly of said pole and fixed to the other end of said operating rod, whereby upward movement of said knob means causes said crank arm means and portions of said connecting link means to move away from said pole and swing said arcuate members to an operative position overlying said body and downward movement of said knob means causes said arcuate members to swing to an inoperative position.

* * * * *